No. 648,936. Patented May 8, 1900.
G. A. ELDER.
LIQUID TEMPERING APPARATUS.
(Application filed Sept. 14, 1899.)
(No Model.) 2 Sheets—Sheet 1.
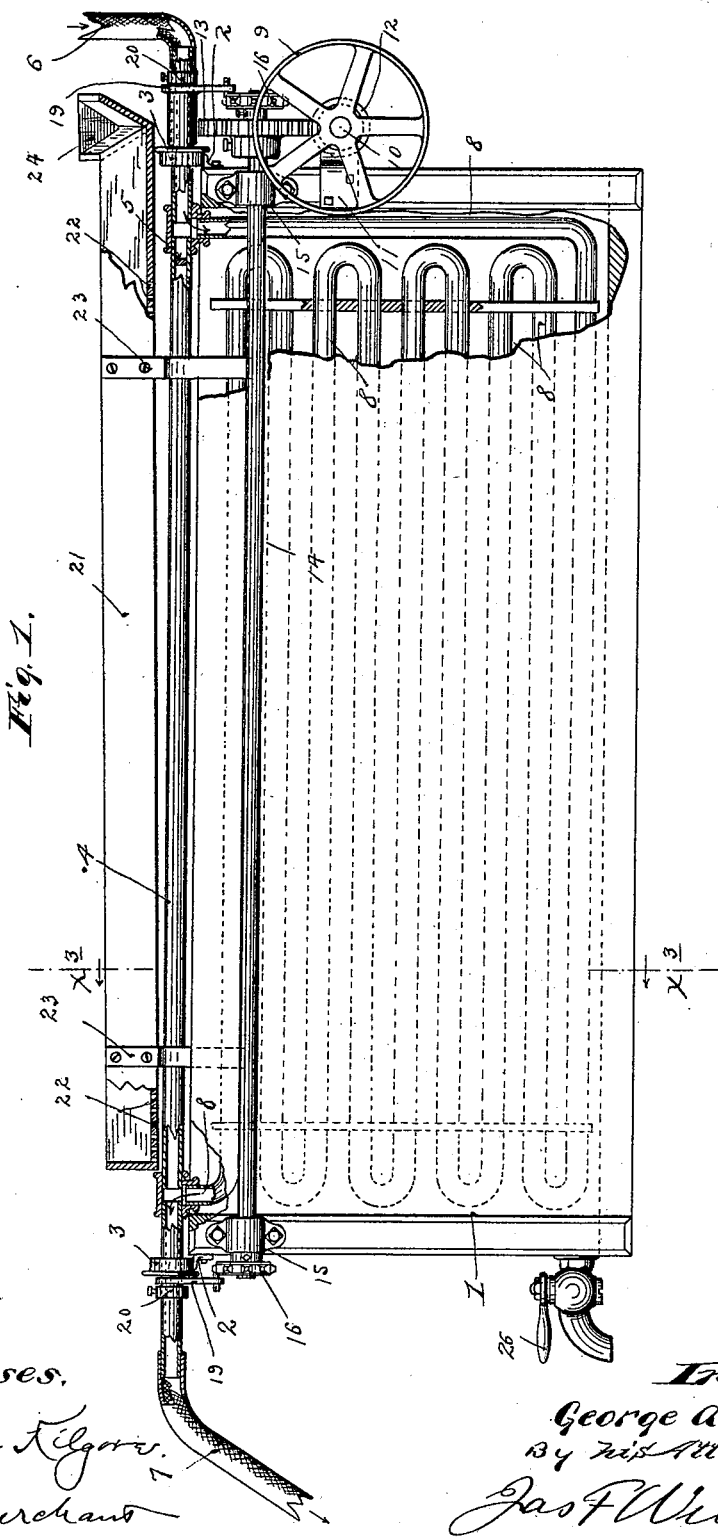

No. 648,936. Patented May 8, 1900.
G. A. ELDER.
LIQUID TEMPERING APPARATUS.
(Application filed Sept. 14, 1899.)
(No Model.) 2 Sheets—Sheet 2.
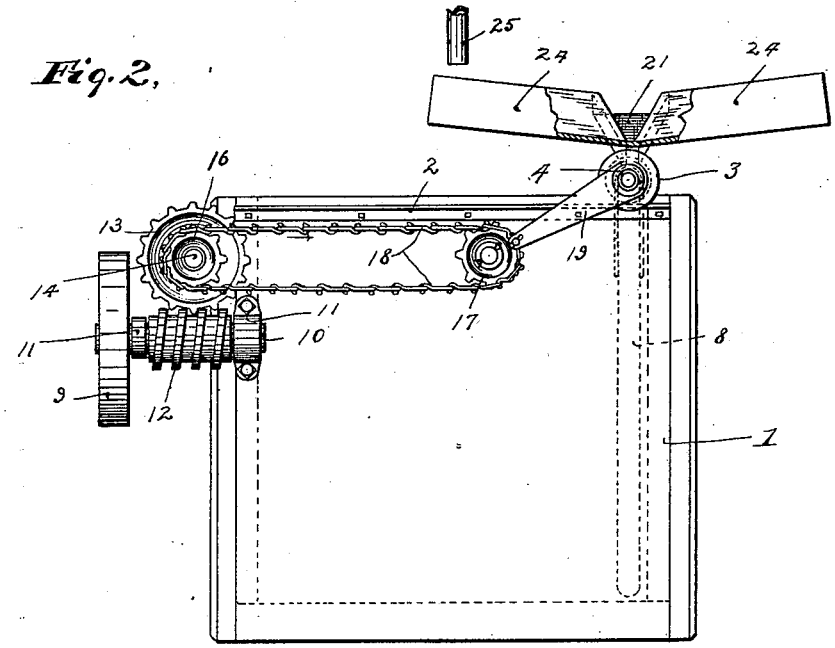
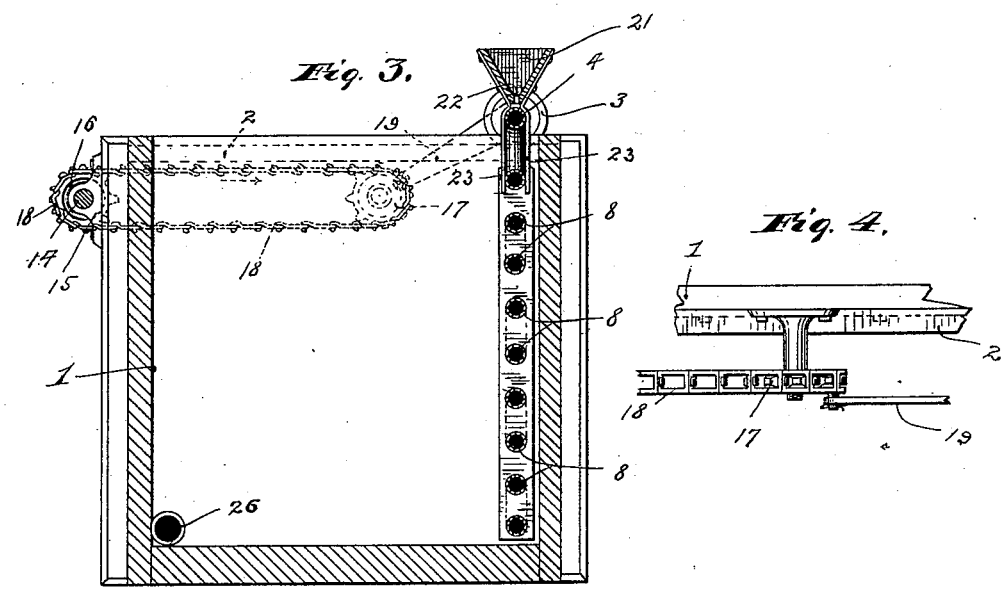
Witnesses.
Harry Kilgore,
F. D. Merchant,
Inventor:
George A. Elder,
By his Attorney,
Jas. F. Williamson United States Patent Office.

GEORGE A. ELDER, OF ST. PAUL, MINNESOTA.

LIQUID-TEMPERING APPARATUS.

SPECIFICATION forming part of Letters Patent No. 648,936, dated May 8, 1900.

Application filed September 14, 1899. Serial No. 730,421. (No model.)

*To all whom it may concern:*

Be it known that I, GEORGE A. ELDER, a citizen of the United States, residing at St. Paul, in the county of Ramsey and State of Minnesota, have invented certain new and useful Improvements in Liquid-Tempering Apparatus; and I do hereby declare the following to be a full, clear, and exact description of the invention, such as will enable others skilled in the art to which it appertains to make and use the same.

My invention relates to an apparatus for tempering liquids, and is especially designed to meet the requirements of an efficient device for tempering cream where carried out on a large scale, as in creameries.

The principal objects had in view in the design of my present invention may be briefly stated as follows: to insure a continuous action of the tempering coil or device on the body of cream or liquid within the vat or tank, to make provision whereby the tempering coil or device will be brought into contact with all of the cream or liquid within the vat or tank, to provide a tempering device which with a given amount of liquid in the vat or tank will have a given or unvariable radiating surface submerged in the liquid throughout the movements of the said tempering device, to provide a simple and efficient device for delivering the cream in a continuous stream into the tank or vat and directly onto a tempering-coil while the said tempering-coil is moving or traveling, and to provide a simple and improved device for moving the tempering coil or head from one to the other extreme part of the said vat or tank.

The apparatus embodying the several features above noted is illustrated in the accompanying drawings and will now be considered in detail.

In the said drawings like characters indicate like parts throughout the several views.

Figure 1 is a side elevation with some parts broken away, showing my said improved apparatus. Fig. 2 is an end elevation of the same. Fig. 3 is a transverse section taken on the line $x^3\ x^3$ of Fig. 1; and Fig. 4 is a detail view in plan, showing a portion of the driving connection or device.

The vat or tank 1, which is preferably rectangular and oblong, as shown in the drawings, may be of any suitable construction and of course of any suitable size. Secured to its ends, near its upper edge, the tank is provided with horizontally-extended rails 2, which, as shown, are of angle form and are bolted or otherwise suitably secured to the said vat. Extended longitudinally of the vat and provided with flanged wheels 3, that run on the rails 2, is a long tubular shaft or pipe section 4, which is plugged, as shown at 5. This tubular shaft 4 is thus mounted by means of the wheels 3, with freedom for movement in a horizontal plane from side to side of the vat 1, and it is in communication at its ends through hose-sections or flexible tubing 6 and 7, respectively, with a suitable source of fluid-supply and a point of exhaust. The flexible delivery-sections 6 and 7 of course permit the traveling movements of the tubular shaft 4. The said tubular shaft 4 carries and has suspended from it the tempering-head, which, as shown, is in the form of a coil or manifold 8, one end of which is connected with the same on the delivery side of the plug 5. This tempering coil or manifold 8, it will be noted particularly by reference to Fig. 1, has the general outline of a rectangle and is of such size that it loosely fits the interior of the vat 1 lengthwise. Hence it follows that when the said tempering-coil 8 is moved from one limit of its movement at one side of the vat, as indicated in Fig. 3, into an opposite extreme position it will have passed through practically the entire interior space of the vat.

Motion is transmitted to the tempering-coil from a power-driven belt, (not shown,) which runs over a pulley 9 on a shaft 10, that is mounted in suitable bearings 11 on the vat or tank 1. This shaft 10 has a worm or screw 12, which meshes with a worm-gear 13 on a long shaft 14, that is extended longitudinally of the vat 1 and is mounted in suitable bearings 15 thereon. This shaft 14 is provided at each end with a sprocket 16, over which and a coöperating idle sprocket 17, loosely mounted on the adjacent end of the vat 1, an endless sprocket-chain 18 is mounted to run. One link of each chain 18 is pivotally connected to one end of a pitman 19, the other end of which pitman is pivotally mounted on the adjacent end of the tubular shaft 4, directly outward of the wheels 3. As shown, collars 20, suitably secured to the said tubular shaft 4, hold the pitmen 19 against lateral displacement, and these pitmen in turn prevent the flanged wheels 3 from running off the rails 2.

Supported above and detachably secured to the tempering-coil 8 is a feed-trough 21, which is perforated at its bottom, as shown at 22, and is provided with depending prongs or forks 23, which embrace the upper fold of the coil 8 and straddle the tubular shaft 4. When thus supported, the perforations 22 of the trough 21 stand directly over the tubular shaft 4 and the folds of the coil 8, so that the cream which is fed into said trough will run downward over said tubular shaft and the folds of the coil 8 until it reaches the body of cream in the vat.

Inasmuch as the trough 21 travels with the tempering-coil 8 and as it is desirable to feed a continuous stream of cream thereto while it is moving, I preferably extend the main trough 21 at one end and provide the same with a transverse extension 24. This transverse extension 24 is in extent equal to or a little greater than the movement which is given to the tempering-coil 8 and trough 21. With this arrangement a fixed supply-pipe 25, properly positioned, can always discharge into the said trough extension 24, regardless of the position of the trough 21. By reference to Fig. 2 it will be noted that the bottom sections of the trough extension 24 incline downward as they run to the receiving end of the trough 21. This insures the proper flow of the cream, even if the tempering-coil 8 be rocked slightly from a true vertical position, which action is, however, not very apt to occur.

26 indicates a faucet which opens from the lower portion of the vat 1 and by means of which the tempered liquid may be drawn off.

Operation: Motion being imparted to the pulley 9, as heretofore described, and the cream being delivered to the trough extension 24 or directly to the trough 21, as desired, the operation will be substantially as follows: The pair of endless sprocket-chains 18 will be driven as indicated by the arrows marked on Figs. 2 and 3, and through the pitmen 19 the tempering-coil and other parts movable therewith will be slowly reciprocated from one side to the other of the vat 1.
For reasons already stated the tempering-coil 8 will under a complete reciprocation be brought into contact with all parts of the liquid or, at least, with practically all parts of the same. The tempering coil or head is in the tempering action moved from side to side of the vat at such a slow rate of speed that gravity acting on the coil will cause it by its own weight to sustain its upright or vertical position. It might of course be more rapidly vibrated; but the best results are obtained by moving it slowly, as indicated.

The pivoted pitmen 19 will of course follow the links of the chain 18, to which they are connected, and in their movement from the right toward the left, considered with reference to Figs. 2 and 3, said pitmen 19 will draw upon the tempering-coil 8, while at their greatest incline and under their movement from the left toward the right they will push against the said tempering-coil while at their least incline. This arrangement insures the proper engagement of the wheels 3 with the rails 2. An action which should be avoided is splashing as the tempering head or coil approaches the sides of the vat. Hence it is important to note that with my improved driving device as the coil closely approaches the limits of its movements its speed is gradually diminished or retarded until the same reaches a momentary standstill. By the same device the said tempering head or coil is started backward in a reverse direction with an accelerated movement. Throughout its main movement through the vat the tempering head or coil is driven at a constant speed. By using larger or smaller wheels 16 and 17 this motion can be varied to meet the speed requirements. It is incidental to the above construction that the cream in the process of tempering the same is thoroughly commingled with the so-called "starter." It is the usual practice to place the starter in the vat before the cream is introduced and then to introduce the cream in a continuous stream, while the tempering or heating coil 8 is slowly reciprocated from side to side of the vat. The cream being introduced through the feed-trough 21, as already described, will run first onto the tubular shaft 4 and from thence over the folds of the tempering-coil 8, so that by the time it has reached the bottom of the vat or the level of the cream which is contained therein it will be partially tempered or heated. Of course as the vat becomes fuller and fuller of the cream a greater amount of tempering-coil will be submerged therein and correspondingly less of the said coil will be left exposed and over which the cream may run as it descends.

The above-described apparatus has proved to be extremely efficient for the purposes had in view, and this statement is based on practical tests made with a full-sized working machine, which has been kept in continuous operation for some time.

The apparatus above described is of course adapted for use either as a cooling device or a heating device, according to whether the tempering medium which is conducted through the tempering coil or head be a relatively warm or cold medium as compared with the temperature of the liquid to be tempered. It is equally obvious that the apparatus is adapted for use for tempering any and all liquids, although it has been especially designed for the treatment of cream as a preliminary step in the art of butter-making on a large scale.

From the foregoing description and statements made it will be understood that the apparatus above specifically described is capable of a very considerable modification within the scope of my invention.

What I claim, and desire to secure by Letters Patent of the United States, is as follows:

1. An apparatus for tempering liquids, comprising a vat and a tempering-coil extended in a vertical plane and mounted to move within the said vat always parallel to its original position, substantially as described.

2. An apparatus for tempering liquids, comprising a vat and a tempering head or section extended in a vertical plane and mounted to move within said vat always parallel to its original position and without rise or fall, substantially as described.

3. An apparatus for tempering liquids, comprising a rectangular vat, and a tempering-head extended in a vertical plane, following closely the cross-section of the interior of the vat and mounted to move transversely within said vat always parallel to its original position, substantially as described.

4. In an apparatus for tempering liquids, the combination with a vat of a vertical tempering head or section mounted to move transversely within said vat always parallel to its original vertical position, over horizontal guideways, substantially as described.

5. In an apparatus for tempering liquids, the combination with a vat having horizontal rails or guides, of a tempering head or section mounted to move transversely within said vat and supported by truck wheels or rollers running over said horizontal rails or guides on said vat, substantially as described.

6. In an apparatus for tempering liquids, the combination with a rectangular vat, having horizontal rails or guides, of a horizontally-extended tubular shaft with liquid supply and discharging sections and wheels or rollers that work on said rails or guides, and a tempering-coil communicating at its ends with said tubular shaft and being supported therefrom, said coil depending within said vat and movable always parallel to its original position, substantially as described.

7. In an apparatus for tempering liquids, the combination with a vat having horizontal guides or runways, of a tempering-coil having wheels or rollers loosely mounted at the upper portion thereof and running over said horizontal guides or runways of said vat, whereby the said coil is mounted for movement transversely of the vat and will be held always vertical by its own gravity, substantially as described.

8. In an apparatus for tempering liquids, the combination with a vat having horizontal guides or rails, of a tempering-coil provided at its upper portion with projecting trunnions, of wheels or rollers loose on said trunnions, and working on the said guides or rails of said vat, and means for reciprocating said tempering-head comprising an endless driving connection with suitable guides and drivers, and a pitman pivotally connected to said endless driving connection and to one of the trunnions of said heating coil or head, substantially as and for the purposes set forth.

9. The combination with a vat or tank, of a tempering coil or head mounted to move transversely within said vat, always in a vertical position, and a longitudinally-extended feed trough or spout secured to and above said tempering coil or head, substantially as described.

10. The combination with a tank or vat and a relatively-fixed delivery-pipe 25, of horizontal guides on said vat, the gravity-suspended and vertically-held heating coil or head movable over said guides on said vat, and the longitudinally-extended feed trough or spout secured to said tempering head or coil, said spout or trough having a perforated bottom and provided with the transverse spout extensions 24, extending always in under the fixed delivery-pipe 25, substantially as described.

In testimony whereof I affix my signature in presence of two witnesses.

GEORGE A. ELDER.

Witnesses:
M. M. McGRORY,
F. D. MERCHANT.